United States Patent [19]

Moricca et al.

[11] 3,993,407
[45] Nov. 23, 1976

[54] POLYSENSORY MOBILITY AID

[75] Inventors: Larry S. Moricca, Churubusco; Ronald H. Stroer, Fort Wayne, both of Ind.

[73] Assignee: Zipcor, Inc., Fort Wayne, Ind.

[22] Filed: Sept. 19, 1975

[21] Appl. No.: 615,060

[52] U.S. Cl. .............................. 356/1; 178/DIG. 32; 250/222 R; 340/407; 356/152
[51] Int. Cl.[2] ........................................ G01C 3/00
[58] Field of Search .................. 356/1, 4, 141, 152; 250/222 R; 340/407; 178/DIG. 32

[56] References Cited
UNITED STATES PATENTS

| | | | |
|---|---|---|---|
| 3,198,952 | 8/1965 | Benham et al. ....................... | 356/1 |
| 3,369,228 | 2/1968 | Foster .......................... | 178/DIG. 32 |
| 3,543,666 | 5/1968 | Kazel ..................................... | 356/4 |
| 3,546,467 | 12/1970 | Benjamin, Jr. et al. ................. | 356/1 |
| 3,654,477 | 4/1972 | Benjamin, Jr. .......................... | 356/5 |
| 3,907,434 | 9/1975 | Coles ..................................... | 356/4 |

Primary Examiner—Maynard R. Wilbur
Assistant Examiner—S. C. Buczinski
Attorney, Agent, or Firm—Gust, Irish, Jeffers & Rickert

[57] ABSTRACT

A polysensory mobility aid comprising first and second signal generating means which produce audio frequency signals, respectively, these signals being coupled to two electrically operable stimulating devices which provide both tactile and auditory stimulation. Each of the signal generating means includes two camera means that generate signals representative of the brightness of optical images projected thereonto. Each signal generating means includes a first fixed frequency signal generator which provides a first signal, and a second variable frequency signal generator which provides a second signal which varies in frequency between limits of a predetermined frequency spectrum, each first and second signal generator being coupled to one of the stimulating devices. Each camera means includes first and second photosensitive devices disposed to receive radiation from a common object. The first signal generator includes first circuit means connecting the first photosensitive device to said first signal generator for selectively activating and deactivating the latter in response to the level of image brightness on said first photosensitive device. Second circuit means connects said second photosensitive device to said second signal generator for varying the frequency of the second signal thereof in response to varying image brightness on said second photosensitive device. The two camera means are positioned fixedly in horizontally spaced relation to have horizontally spaced independent fields of view whereby conjoint oscillatory rotational movement of said camera means about a vertical axis generally between said camera means causes successive imaging of an object onto said two camera means.

15 Claims, 9 Drawing Figures

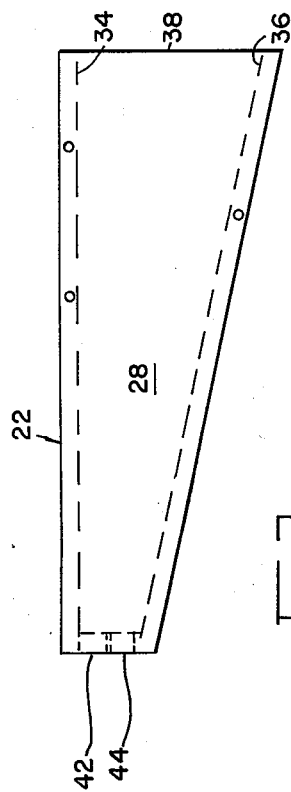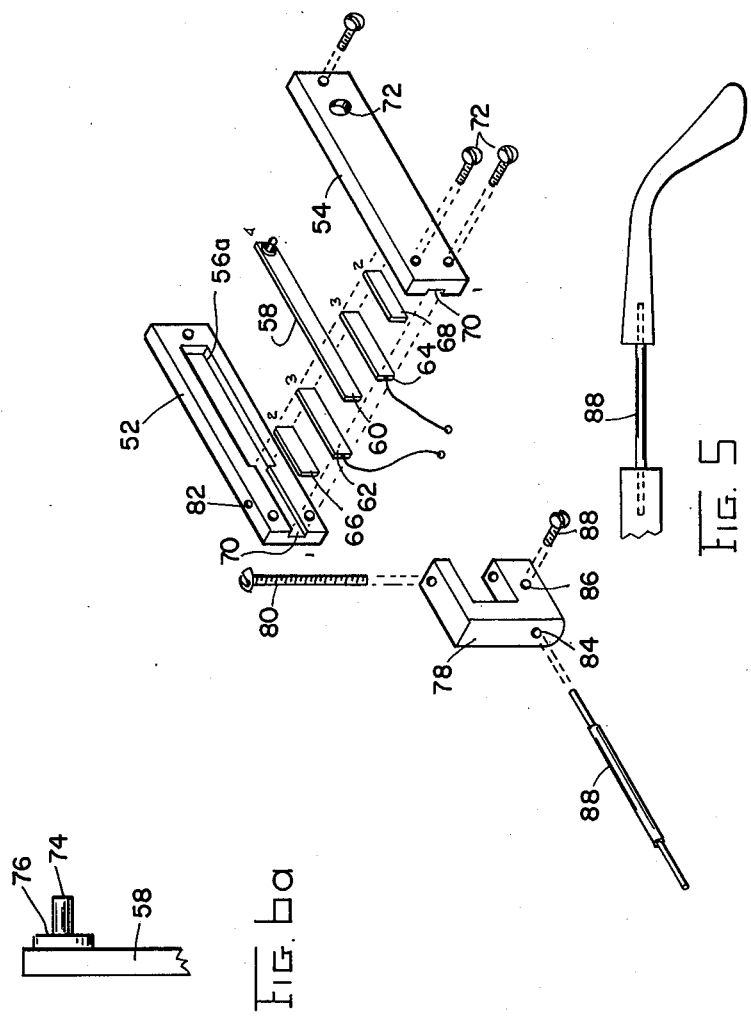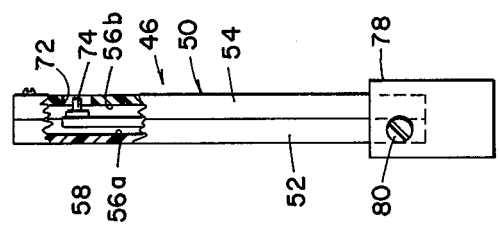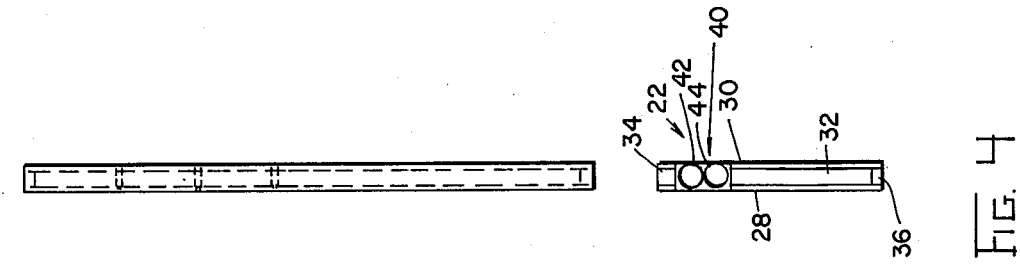

POLYSENSORY MOBILITY AID

BACKGROUND OF THE INVENTION

1. Field of the Invention

This invention relates generally to sight systems for the blind and more particularly to a sight system that utilizes the senses of hearing, touch, and kinethesis for perceiving objects in a given optical field.

2. Description of the Prior Art

Recognition of environmental objects is an important factor in general human mobility. Although most persons depend upon vision for their primary source of information about the features of their surroundings, the blind individual must depend upon his other senses, usually auditive, or, if aided by mechanical devices, the haptic sense. It is known that optical information may be transmitted to the brain by a pathway other than the eye, for example a television system being utilized as the optical sensor to drive a tactile transducer placed against the skin. It is also known that the auditive sense is directionally sensitive, such that a sound can be localized as to the direction from which it emanates. It has been determined that the time difference with which the two ears are stimulated determines the direction of sound emanation. If both ears are stimulated simultaneously and there is no time difference, the sound is heard as being dead ahead. A device for utilizing this time difference in the form of a mobility aid, is disclosed and claimed in Coles application Ser. No. 502,033 filed Aug. 30, 1974, now U.S. Pat. No. 3,907,434.

Another device useful as a mobility aid is disclosed in prior U.S. Pat. No. 1,820,357 relating to a vision-tone device.

SUMMARY OF THE INVENTION

In accordance with the broader aspects of this invention, there is provided a polysensory mobility aid for producing a combination of auditory and tactile stimulation representative of the location, distance and brightness of a visible object in relation to a viewing person. The system includes first and second signal generating means which produces audio frequency signals, respectively. Two electrically operable stimulating devices are coupled, respectively, to said first and second signal generating means for activation in response to said signals, respectively. Each of said signal generating means includes two camera means that generate signals representative of the brightness of optical images projected thereonto. Each signal generating means includes a first fixed frequency signal generator which provides a first signal, a second variable frequency signal generator which provides a second signal which varies in frequency between predetermined limits of a frequency spectrum. Each first and second signal generator is coupled to one of the stimulating devices.

Each camera means includes first and second photosensitive devices, preferable in the form of photoconductors, disposed to receive light radiation from a common object. The first signal generator includes circuit means connecting the first photosensitive device to the first signal generator for selectively activating and deactivating the latter in response to image brightness on said first photosensitive device above and below, respectively, a predetermined level. The second signal generator includes second circuit means which connects the second photosensitive device to the second signal generator for varying the frequency of the second signal in response to varying image-brightness impinging on the second photosensitive device. Means for fixing the positions of the two camera means in spaced relation in such a manner that they have horizontally spaced independent fields of view. Thus, oscillatory rotational movement of said camera means about a vertical axis causes successive imaging of an object onto said camera means.

It is an object of this invention to provide a polysensory mobility aid for producing signals useful in providing stimulation of the auditory and tactual senses in determining the location, distance and brightness of a visible object with respect to a viewing subject.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 3 is a side view of one camera devices of the apparatus of FIGS. 1 and 2;

FIG. 4 is a rear end view thereof;

FIG. 5 is an exploded view of the polysensory stimulating device used in the embodiment of FIGS. 1 and 2;

FIG. 6 is a top view of the stimulating device partially broken away and sectioned for clarity of illustration;

FIG. 6a is a fragmentary view of the end portion of the piezoelectric beam mounted inside the housing shown in FIG. 6;

DESCRIPTION OF THE PREFERRED EMBODIMENT

Figure 1:
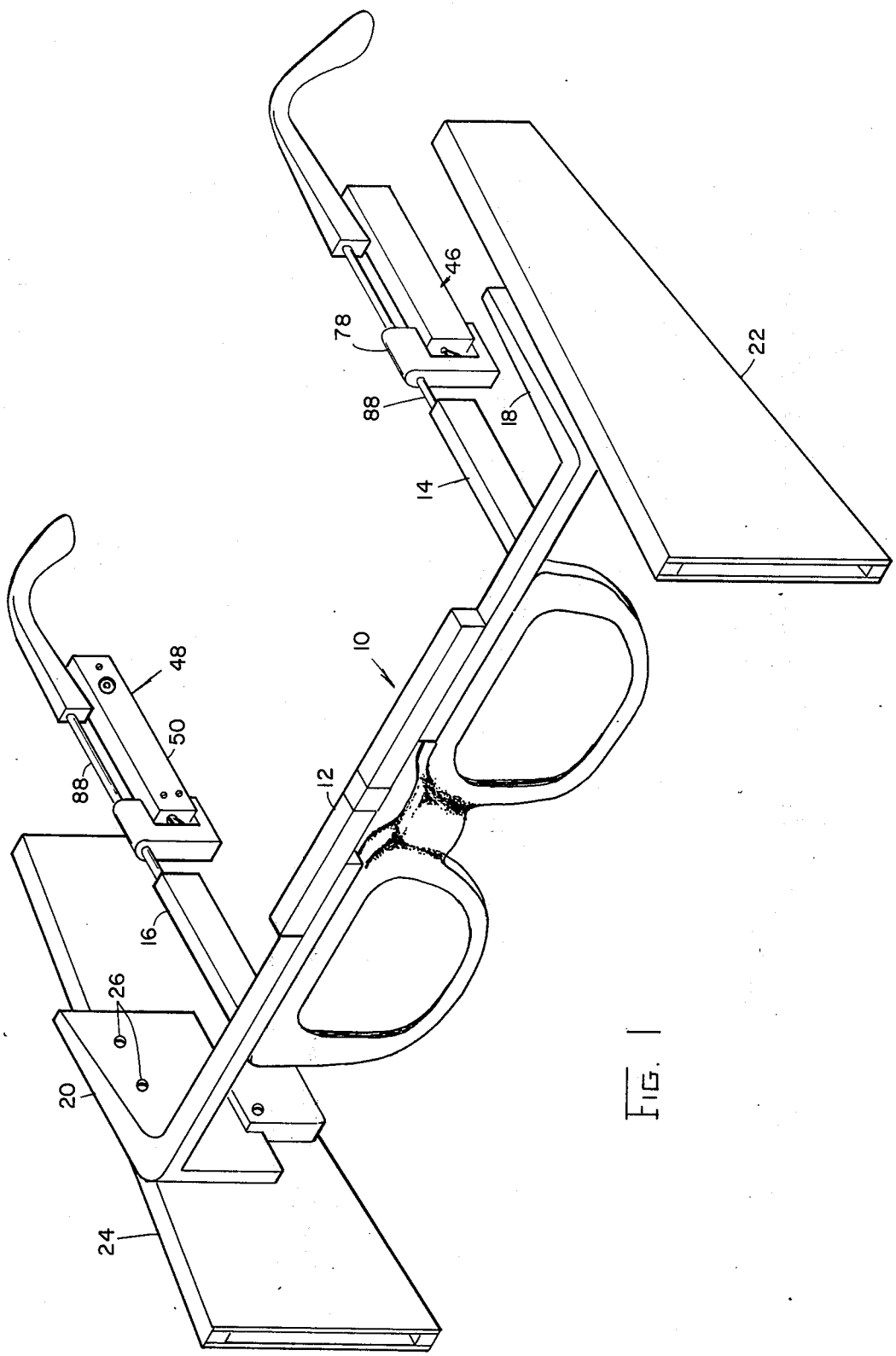
FIG. 1 is a perspective illustration of one embodiment of this invention.

Referring to the drawings, a polysensory mobility aid capable of converting optical information into auditive and tactual information shown. Referring to FIGS. 1 through 6, a frame 10, resembling the frame for spectacles and worn in the same manner, has a bridge portion 12 and left and right temples 14 and 16. The bridge 12 has extensions beyond the respective temples 14 and 16 provided with rearwardly extending flanges 18 and 20, respectively, which mount two camera devices 22 and 24 thereon as shown. The flanges 18 and 20 and the associated camera devices 22 and 24 generally parallel the respective temples 14 and 16, the camera devices 22 and 24 themselves being elongated and generally parallel so as to have horizontally spaced, optical axes and independent fields of view. The camera devices 22 and 24 are secured to the respective flanges 18 and 20 by means of suitable screws 26 (FIG. 1).

Referring to FIGS. 1 through 4, the camera devices 22, 24, which are illustrated substantially to scale, will be described.

A description of one camera device 22, 24 will suffice for both since they preferably are of identical construction. A device 22, 24 is elongated and rectangular in cross-section. Parallel, opaque sides 28 and 30 are spaced apart a distance only sufficient to provide a narrow slot 32, which in an operating embodiment of this invention, is only 0.09 inches: the length is 4 inches. The lateral edges of the defined slot 32 are closed by means of elongated strips of suitably opaque material 34 and 36, the sides 28 and 30 being secured thereto to complete a slotted enclosure or tunnel. As will be seen in FIGS. 1 and 3, the camera device is not only elongated but it is tapered, the widest portion being at the front end 38 and the narrowest at the rear end 40. The sides 28 and 30 and the edge strips 34 and 36 define a light tunnel in the form of a elongated slot which is vertically oriented.

In the rear end 40 of the tunnel is mounted two photosensitive elements 42 and 44 having the light sensitive portions thereof exposed toward the front end 38 of the tunnel. These photosensitive elements 42 and 44 in the preferred embodiment of this invention are in the form of photoconductors which change in resistance in response to changes in intensity of impinging radiation. Thus, the two photosensitive elements 42 and 44 "see" the light that enters the front end 38 of the tunnel 32.

Referring once again to FIGS. 1 and 2, the camera devices 22 and 24 are arranged parallel with the tunnel slots vertically oriented and the longitudinal axes horizontal such that each sees different objects or fields. In a preferred embodiment, these camera devices 22 and 24 are spaced 7 inches apart.

As explained earlier, the tactual and auditive senses are utilized for the purpose of determining object distance, location and brightness. A single device is used for providing both auditive and tactile stimulation, this being indicated generally by the reference numeral 46, two such devices 46 and 48 being utilized as shown more clearly in FIG. 1. Since these devices are identical in construction, except for being allochirally configured, a description of one will suffice for both. Such a device is shown in FIGS. 5, 6 and 6a. The device generally includes a housing 50 formed in two halves 52 and 54, each having an elongated, rectangular cavity portion 56a and 56b which together form an enlarged elongated cavity that receives a beam shaped piezoelectric crystal 58. The crystal 58 is free to vibrate in the cavity 56a, 56b, being secured at the end 60 by being clamped between two copper strips 62 and 64 in turn clamped to the housing halves 52 and 54 between rubber strips 66 and 68 which are relatively soft to facilitate vibrational activation of the piezoelectric crystal 58. These parts 60 through 68 are fitted into mating slots 70 in the housing halves 52 and 54 such that when the latter are secured together by means of screws 72, the piezoelectric crystal 58 is secured in place at one end and is free to vibrate upon being excited by a suitable electrical signal.

As seen more clearly in FIGS. 6 and 6a, the housing half 54 has an opening 72 which receives with clearance a tactile pin 74, preferably of metal, which is secured to the crystal 58 by means of a plastic block 76 that insulates the pin 74 from the crystal 58. The pin 74 is made to such length that it either slightly protrudes through the opening 72 or is flush with the surface of the housing half 54. Thus, placing the housing 50 against the skin and causing the crystal 58 to vibrate will result in the tactile pin 74 touching the skin and causing a sensation corresponding to the magnitude and frequency of the crystal 58 vibration.

The housing 50 is mounted for swinging movement about a vertical axis by means of an adaptor bracket 78 having spaced arms which receive therebetween the end portion of the housing 50, a pivot pin 80 passing through companion holes in the adaptor arms and the housing 50 as shown. The fit of the pin 80 with the hole 82 in the housing 50 is snug so as to provide frictional resistance to the swinging movement of the housing 50. The reason for this will become apparent as the description proceeds.

Figure 2:
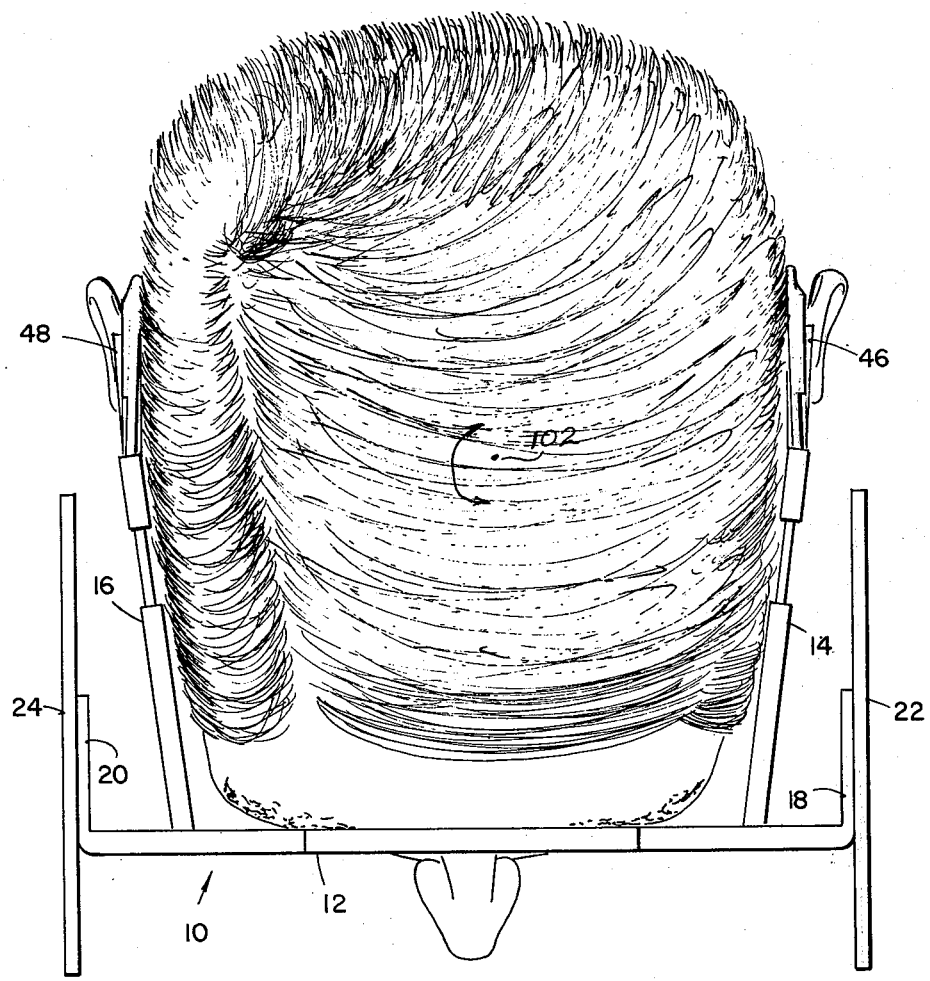
FIG. 2 is a top plan view thereof shown as being worn by a person.

The adaptor bracket 78 also is provided with a bore 84 which is intersected by a threaded hole 86 which receives a set screw 88. The bore 84 is adapted pivotally to receive the round temple shaft 88. Thus the bracket 78 may be swung about the shaft 88 which generally is aligned horizontally, carrying the housing 50 with it, the latter also being swingable about the vertical pivot pin 80. As shown in FIG. 2, the housing 50 may be thus moved to a position at which the tactile pin 74 is touched against a sensitive part of a person's skin, a portion of the ear being most preferred because of its sensitivity.

A person having the spectacles-type frame 10 and stimulating devices 46 and 48 positioned contiguous to the ears with the tactile pins 74 engaging the skin, energization of the piezoelectric crystals 58 with signals in the audio frequency range will result in producing an audible sound. Simultaneously, the tactile pins 74 will vibrate against the skin thereby producing a sensation. Thus, both the auditive and tactual senses are utilized in detecting the vibration of the crystals 58.

The electrical circuitry for coupling the camera devices 22 and 24 to the respective stimulating devices 46 and 48 will now be described in connection with FIGS. 7 and 8. The camera devices 22 and 24 are coupled to the respective stimulating devices or transducers 46 and 48 by means of signal generating means indicated by the reference numerals 90 and 92 respectively. Since the two signal generators 90 and 92 are identical, a description of one will suffice for both. Referring to the circuit 90, it includes a fixed frequency oscillator or signal generator 94 having its input circuit connected to the photoconductor 42 and its output circuit connected to an audio signal amplifier 96. The output circuit of the amplifier 96 is connected to the transducer 46 which more particularly includes the piezoelectric crystal 58. Also connected to the transducer 46, 58 is a variable frequency oscillator 98 which has connected thereto by suitable circuitry shown in FIG. 8 the photoconductor 44. Both of the oscillators 94 and 98 provide signals at a frequency in the audible range, the signal of the oscillator 94 being a fixed frequency determined by the resonant characteristics of the piezoelectric device 58, 74, 76 usually in the range of about 200 to 300 hertz and preferably about 250 hertz and the oscillator 98 in the range from 500 to 10,000 hertz. A preferred fixed frequency for the oscillator 94 is about 200 hertz. The resonant frequency of the crystal 58 and the other parts carried thereby preferably should be within plus or minus 25 hertz of the frequency of oscillator 94.

The photoconductor 42 functions primarily as an "on-off" switch which responds to brightness levels above a predetermined threshold level to cause operation of the oscillator 94. At brightness below this threshold level, the oscillator 94 is quiescent. The photoconductor 44 is so connected in the oscillator 98 that a change in brightness on the photoconductor 44 causes a change in the output frequency. The circuit is so arranged that increasing brightness on the photoconductor 44 causes a corresponding increase in the frequency of the output signal.

The amplifier 96 is used for the purpose of increasing the amplitude of the output signal of the oscillator 94. Thus, the signal applied to the transducer 46, 58 from the fixed frequency channel 42, 94, 96 is of a greater magnitude than that from the channel of oscillator 98. Since the skin is acutely sensitive to tactile vibration in the frequency range from about 200 to 300 hertz, the frequency of the channel 42, 94, 96 is selected to be within this range. Also the resonant frequency of the tactile transducer 58, 74, 76 is selected to be within this same range whereby vigorous tactile excitation is produced at a frequency at which the skin is most sensitive. This assures that the person will feel the vibrations of the transducer 58, 74, 76 when it is energized.

In use, the channel 42, 94, 96 is utilized for the purpose of tactile stimulation, i.e., causing vibratory contact of the tactile pin 74 with the skin at the fixed frequency of, for example, about 250 hertz, while the channel 44, 98 which varies in frequency with brightness changes on the photoconductor 44 serves to excite the transducer 46, 58 into audible vibration.

Figure 7:
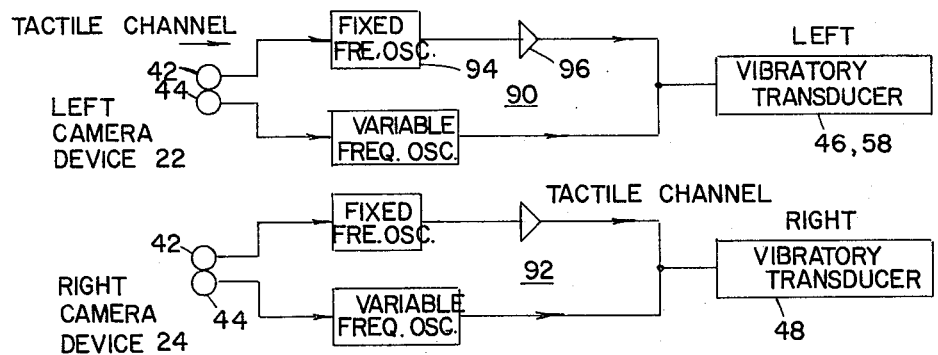
FIG. 7 is a block diagram of the electrical circuitry used in explaining the operation of the invention.
Figure 8:
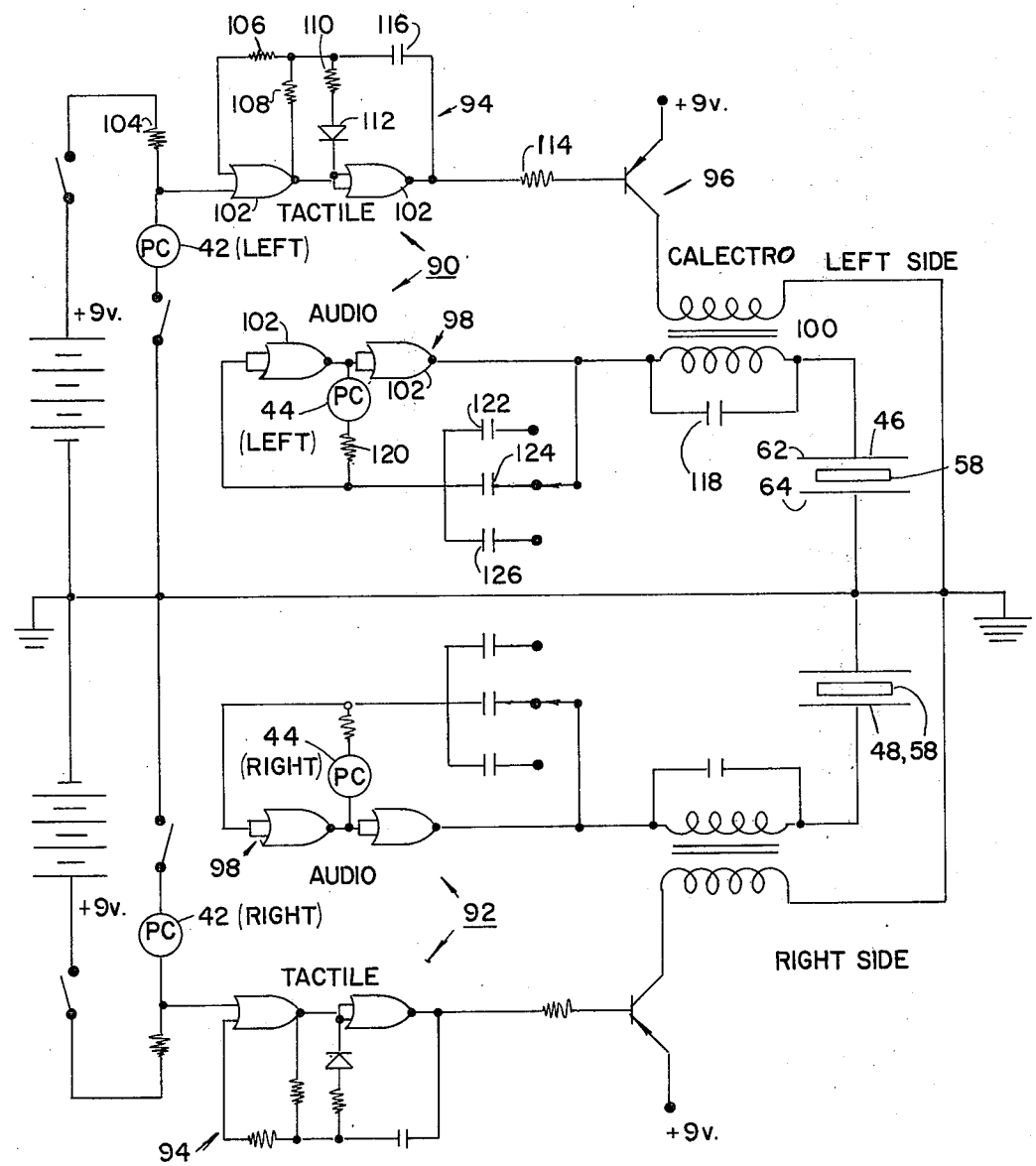
FIG. 8 is a schematic diagram thereof.

A specific circuit configuration of the generally illustrated diagram of FIG. 7 is shown in FIG. 8 wherein like numerals indicate like parts. The two oscillators 94 and 98 include integrated gate circuits of the type identified as 4001AE. The oscillator 94 is normally quiescent unless radiation above a predetermined level or intensity is projected onto the photoconductor 42. Intensity above this level reduces the resistance of the photoconductor 42 sufficiently to cause the oscillator 44 to operate. The output signal is amplified by the transistor 96, this amplified signal being coupled to the transducer 46, 58 via the transformer 100.

The photoconductor 44 reduces in resistance with increasing brightness causing the output signal of the oscillator 98 to correspondingly increase in frequency. This output signal is coupled to the transducer 46, 58 via the transformer 100. Thus, signals from both the fixed frequency oscillator 94 and variable frequency oscillator 98 are coupled to the transducer 46, 58.

In use, the mobility aid as shown in FIG. 1 is mounted in the same manner as spectacles on the head (see FIG. 2), the temples 16 and 18 fitting in the usual manner behind the ears and the nose piece of the bridge 12 fitting over the nose. The transducers 46 and 48 are moved to a position at which preferably the tactile pins 74 just touch respective portions of the ears (FIG. 2) and the transducers 46 and 48 themselves are close to the ears so that the vibrations of the piezoelectric crystals 58 may be heard.

FIG. 2 is illustrative of the physical movements of the wearer during use of the invention. With the circuit of FIG. 8 energized, source light of given brightness falling on, for example, the photoconductors 42 and 44 of the camera device 22 will cause vibration in the audible range of the transducer 46. If the light source is sufficiently small so as not to be seen at the same time by the camera device 24, only the transducer 46 will be excited. By turning the head about a verticle axis 103, the camera device 24 may be brought into registry with the same light source. Once this happens, the camera device 22 will become deactivated thereby turning "off" the transducer 46, but the camera device 24 will become excited causing its transducer 48 to audibly vibrate. The person, therefore, by rotating his head to and fro about the axis 103 can cause the two camera devices 22 and 24 successively to scan the same object or light source thereby providing timed sequence excitation of the transducers 46 and 48, the latency between excitations depending upon the rate at which the person rotates his head. Assuming that the brightness level is insufficient to cause operation of the tactile channel 42, 94, 96, the transducers 46 and 48 will produce audio tones depending upon the brightness level of the object being viewed. Since the right and left circuits (FIGS. 7 and 8) are designed to produce the same tone for a given level of brightness on the respective photoconductor 44, the wearer will determine by the tone that those camera devices 22 and 24 are viewing the same object, since higher brightness levels, for example, produce higher frequencies. Thus the person determines the brightness level by the particular frequency or, in the alternative, determines that certain objects are brighter than others by reason of the difference in frequencies emanating from the transducers 46, 48. As stated previously, brightness below a given level of intensity will not switch the fixed frequency oscillator 94 "on"; however, should the brightness exceed this level, the oscillator 94 is switched on causing the transducer to vibrate at the 250 hertz frequency with an intensity sufficient to be felt by the person. Thus, the person is informed that the object viewed has a brightness level above that of other portions of the environment. The channel 42, 94, 96, may therefore be regarded as an on-off system which serves as an alarm to inform the wearer of a high intensity brightness source, such as an automobile headlight.

If it is assumed that the subject is viewing a single light source fixed in position at a distance of, for example, six feet, and that the brightness is insufficient to cause activation of the tactile channel 42, 94, 96, the subject may swing his head back and forth about the verticle axis 103 (FIG. 2) causing the two camera devices 22 and 24 to "see" successively the object. This produces sequential signals which are converted into audible sounds by the transducers 46 and 48, these signals occurring at a rate determined by the rate of swinging movement of the subject's head. By repetitive movement, the subject can determine the direction of the light source and can adjust his head and torso to position the light source directly ahead. Thus, the subject uses his kinesthetic sense in localizing the light source. The term polysensory mobility aid, as applied to this invention, means that the auditive, tactual and kinesthetic senses are utilized for providing information representative of visible surroundings.

The time of activation of the two transducers 46 and 48 is inversely related to the distance of the viewed object from the subject. Thus, with practice the subject can not only determine the right-left location of the object but he can also determine the distance. Brightness of the object is of course determined by the frequency of the sounds emanating from the transducers 46 and 48. For extreme brightness levels, the tactile stimulator 74 is activated thereby informing the subject thereof.

Individual object location is made practical by properly eliminating a great portion of the visible information available in almost all realistic settings. The filtering of information is achieved by utilizing the very narrow light tunnels 32 in the camera devices 22 and 24. The slots of the tunnels are arranged vertically since much of the visible environment follows vertical patterns, poles, trees, doorways, and the like being examples. Thus, scanning movement by the subject can result in sequential registry of such objects with the slots such that they can be located. The subject by raising and lowering his head can determine the height of such an object by the change in frequency of the respective transducer when the object falls out of the field of view.

With practice, a blind person can learn to recognize, in a given environment, the various objects therein as to their brightness and location. The threshold brightness level of the tactile stimulator can be set to respond to the brightness of windows and doorways. When viewed from the inside of a building, such windows and doorways are usually brighter than other portions of the indoor environment.

The present invention is based upon the theory that the information normally transferred from the environment to the person by visual processes can also be transferred, at least in part, by other sensory processess. If the environmental information is transduced functionally into perceivable non-visual information, for example, haptic and auditive, the perceived information can be associated, via learning, to real world situations and can be associated with previous perceptions, i.e., recognition. The time delay between excitations of the transducers can be interpreted in a manner similar to that of distance judgment. The audible frequencies of the transducers may be related to the same cognitions that are normally associated with light intensity. Thus, through the senses other than visual, a blind person can perceive at least a portion of the visible environment which will aid in his natural mobility, since recognition of environmental objects is an important factor in general human mobility.

Although most persons depend upon vision for their primary source of information about the various features of their surroundings, the blind individual must depend upon his other senses, usually audition, or, if aided by mechanical devices, the haptic sense. It has become apparent in recent years that additional mobility aids must not interfere with these traditional and important sources of environmental information: auditive and tactual sensations. In addition, mobility aids must be cosmetically acceptable to their users.

The present invention is unique in that it utilizes the auditive and haptic sensations in a manner that is comfortable to the user and in appearance indeed is cosmetically acceptable. Through the use of the present invention, there develops a reliable method for quickly determining the general geographic layout of surroundings, including the location of doorways, windows, stairways and furniture indoors, and in the location of primary outdoor objects such as telephone poles, buildings, bushes and the like.

In the working embodiment disclosed, and referring more particularly to FIG. 8, by reason of the series photoconductor 44 and the resistor 120 connection, the apparatus operates effectively in environments of different ambient light levels, such as are encountered both indoors and outdoors.

A working embodiment of this invention has the following dimensions and values, these being given as exemplary and not as limitations.

| | |
|---|---|
| Photoconductor 42 | CL-909L |
| Photoconductor 44 | CL-909L |
| Gates 102 | 4001AE |
| Resistor 104 | 1 megohm |
| Resistor 106 | 1 megohm |
| Resistor 108 | 3.3 megohm |
| Resistor 110 | 100,000 ohms |
| Diode 112 | 1N914 |
| Resistor 114 | 33,000 ohms |
| Capacitor 116 | .01 mfd |
| Transistor 96 | MPS A70 |
| Transformer 100 | Calectro 717 |
| Capacitor 118 | 0.0075 pf |
| Resistor 120 | 220,000 ohms |
| Capacitor 122 | 750 pf |
| Capacitor 124 | 51 pf |
| Capacitor 126 | 180 pf |
| Length of slot 32 | 1.5 inches |
| Width of slot 32 | 0.9 inches |
| Peak resonant frequency of transducer 58, 74, 76 | 250 hertz |

While there have been described above the principles of this invention in connection with specific apparatus, it is to be clearly understood that this description is made only by way of example and not as a limitation to the scope of the invention.

What is claimed is:

1. A polysensory mobility aid comprising first and second signal generating means which produce audio frequency signals, respectively, two electrically operable stimulating devices coupled, respectively, to said first and second signal generating means for activating each of said devices in response to said signals, respectively;

each of said signal generating means including two camera means that generate signals representative of the brightness of optical images projected thereonto, each signal generating means including a first fixed frequency signal generator which provides a first signal fixed frequency and a second variable frequency signal generator which provides a second signal which varies between limits of a predetermined frequency spectrum, each first and second signal generator being coupled to a respective one of said stimulating devices;

each camera means including first and second photosensitive devices disposed to receive radiation from a common object, said first signal generator including first circuit means connecting said first photosensitive device into said first signal generator for selectively activating and deactivating the latter in response to image brightness on said first photosensitive device above and below, respectively, a predetermined level, said second signal generator including second circuit means connecting said second photosensitive device into said second signal generator for varying the frequency of the second signal thereof in response to varying image brightness impinging on said second photosensitive device;

means positioning said two camera means in horizontally spaced relation to have horizontally spaced independent fields of view, whereby oscillatory rotational movement of said camera means about a vertical axis generally between said camera means causes successive imaging onto said two camera means of an object being viewed.

2. The polysensory mobility aid of claim 1 in which said positioning means includes a frame which also carries said two stimulating devices in spaced relation.

3. The polysensory mobility aid of claim 2 in which said two stimulating devices are substantially indentical and produce mechanical vibrations corresponding to the frequencies of the first and second signals applied thereto.

4. The polysensory mobility aid of claim 3 in which the magnitude of said first signal is greater than the magnitude of said second signal, said first signal being at a frequency adjacent to the lower end of the frequency range of said second signal.

5. The polysensory mobility aid of claim 4 in which said first signal has a frequency falling within the range of from about 200 hertz to about 300 hertz and the spectrum of said second signal ranges from about 500 hertz to 10,000 hertz.

6. The polysensory mobility aid of claim 5 in which each said two stimulating devices include a piezoelectric element that vibrates in response to said first and second signals.

7. The polysensory mobility aid of claim 1 in which said positioning means is a spectacle-type frame having a bridge portion and hinged temples, said camera devices being fixedly secured to the opposite end portions, respectively, of said bridge portion and said two stimulating devices being carried by said temples, respectively.

8. The polysensory mobility aid of claim 7 in which each camera device includes a light tunnel having front and rear ends horizontally spaced, said front end being open, said tunnel defining an elongated light-receiving path with the paths of both tunnels being arranged substantially parallel, the first and second photosensitive devices being adjacent and disposed toward the rear end of each tunnel, each tunnel being generally slot shaped in cross-section with the widest dimension thereof being vertically aligned.

9. The polysensory mobility aid of claim 8 in which each tunnel is longitudinally tapered with the widest portion thereof being at the front.

10. The polysensory mobility aid of claim 7 in which each said stimulating devices includes a piezoelectric element.

11. The polysensory mobility aid of claim 10 in which said piezoelectric element is in the form of a beam cantilever mounted at one end on a supporting member, said supporting member being mounted on a respective one of said temples for universal swiveling movement, whereby said piezoelectric element may be adjusted to touch a wearer of the polysensory mobility aid on or near the ear.

12. The polysensory mobility aid of claim 11 in which said supporting member is an elongated frame having said piezoelectric element in a hollow portion thereof, and a pin-like element carried by and projecting laterally from the distal end of said piezoelectric element which serves as a tactile stimulator.

13. The polysensory mobility aid of claim 1 in which each said stimulating device includes a piezoelectric element which vibrates in response to said first and second signals, a tactile element carried by said piezoelectric element, said first signal having a fixed frequency lying in the range of about 200 to 300 hertz, said first signal generator including an amplifier which raises the magnitude of said first signal to a level at which said piezoelectric element produces tactile stimulation; said second signal being of a magnitude that causes said piezoelectric element to vibrate audibly; the magnitude of said first signal being greater than that of the second signal.

14. The device of claim 13 in which said second signal generator includes means for progressively increasing the frequency of said second signal with corresponding increase of image brightness on said second photosensitive device, whereby the device functions effectively over a large range of lighting conditions.

15. The device of claim 14 in which said photosensitive devices are photoconductors.

* * * * *